Patented Nov. 17, 1953

2,659,728

UNITED STATES PATENT OFFICE 2,659,728

BIS-HYDROXYTETRAHYDROISO-QUINOLYL-ALKANES

Paul N. Craig, Elkins Park, and Fred P. Nabenhauer, Philadelphia, Pa., assignors to Smith, Kline & French Laboratories, Philadelphia, Pa., a corporation of Pennsylvania No Drawing. Application July 5, 1951,
Serial No. 235,394

5 Claims. (Cl. 260—286)

The invention relates to certain new chemical compounds, a new class of bis-substituted-alkanes, possessing physiological activity; and more particularly, relates to a series of hydroxy-substituted bis-tetrahydroisoquinolyl-alkanes and their acid addition salts, which have utility as bronchodilators and blood pressure lowering agents.

The free bases of the compound according to this invention are represented by the following general formula:

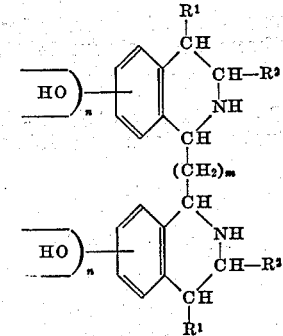

in which:

R$^1$, R$^2$ are selected from the group consisting of hydrogen and lower alkyl radicals.

$n$ is an integer of from 1 to 3.
$m$ is an integer of from 1 to 12.

The organic and inorganic salts contemplated by this invention include by way of example salts of the bases formed with organic acids such, for example, as glycolic, oxalic, maleic, camphor-sulfonic, acetic, tartaric, etc., and inorganic acids such as for example, sulfamic, hydrochloric, hydrobromic, sulfuric, phosphoric, etc. More specifically, the inorganic and organic salts will be such as are prepared with inorganic and organic acids having an ionization constant not less than $1 \times 15^{-5}$ at 18° C.

In general, the compounds of this invention are prepared by the reduction of the corresponding methoxy-substituted 3, 4-dihydro compounds to the tetrahydro form followed by demethylation of the methoxy groups to hydroxy radicals. The reduction may be carried out using ordinary techniques well known to the art, such as, for example, by hydrogenation at 50 to 100 p. s. i. of hydrogen in the presence of noble metal catalysts, such as finely divided platinum oxide or palladium on charcoal at temperatures ranging from room temperature to 75° C. Demethylation of the methoxy groups is effected by standard techniques, such as heating with constant boiling hydrobromic acid. This reaction preferably will be carried out in the presence of a trace of hypophosphorous acid. The reduction and demethylation steps may be carried out on the starting material either in the form of the free base or as the acid addition salt thereof. The method of the preparation of these compounds will be made apparent by the following reaction:

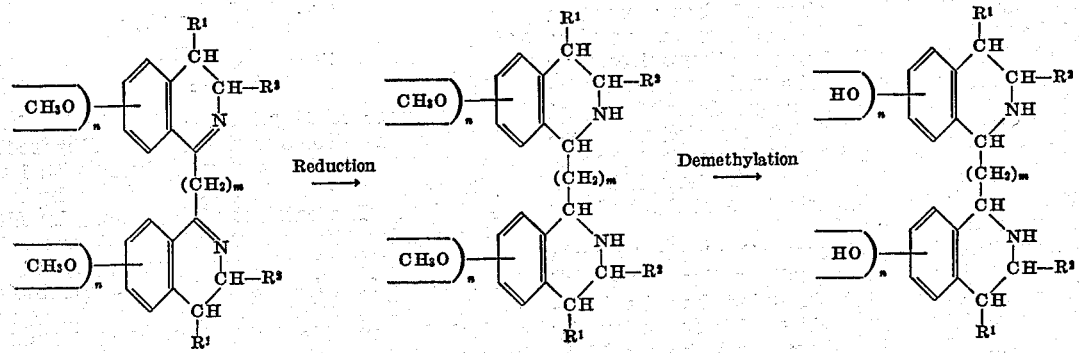

in which:

R$^1$, R$^2$ are selected from the group consisting of hydrogen and lower alkyl radicals.
$n$ is an integer of from 1 to 3.
$m$ is an integer of from 1 to 12.

The methoxy-substituted bis-3,4-dihydroisoquinolyl-alkanes from which the compounds of this invention are prepared are well-known to the art and amply described in the literature or, their structures being made known, are readily prepared by known and obvious procedures. The method of Hahn and Gudjons; Ber: 71B, 2183 (1938), is found particularly applicable for their preparation in which the appropriate methoxy-substituted phenyl-ethylamine is reacted with an α-ω-dicarboxylic-alkanoic acid, its diethyl ester or the acyl chloride, the alkyl chain link of which corresponds to that desired in the final product. The bis-amide so prepared is subjected to ring closure by refluxing in the presence of a dehydrating agent, such as phosphorous oxychloride or phosphorous pentoxide to form the bis-dihydroisoquinolyl-alkane starting material.

It will be noted that the compounds of this invention contain two asymmetric carbon atoms in the 1-positions of the isoquinolyl radicals, and in addition may contain additional asymmetric carbons in the 3 and 4-positions when those positions are substituted by a lower alkyl radical. The presence in the molecule of these asymmetric centers gives rise to at least two isomeric forms, at least one of which is a racemic mixture of two optically active isomers of the compound. In the simplest of such cases where asymmetry occurs only in the 1-position of the tetrahydroisoquinolyl radicals, it is apparent that the reduction of the 3,4-dihydro starting materials will result in the creation of optically active carbon atoms upon the formation of the 1,2,3,4-tetrahydro compound. Thus, such a compound would occur in three isomeric forms, the dextro and the levo-rotatory forms, as well as the meso which is not optically active. The dextro and levo isomers together comprise the racemic mixture whose melting point and other phydrical characteristics substantially differ from those of the meso form. The racemic mixture can be separated from the meso form by virtue of their differences in solubility in a common solvent with repeated recrystallizations. Throughout the specification and claims the less soluble of the racemic and meso forms is identified as isomer A; the more soluble, isomer B.

Separation of the optically active dextro and levo components of the racemic mixture will be accomplished by methods for resolution well-known to the art, such as, for example, the formation of a tartaric acid addition salt using an optically active isomer, such as dextro-tartaric acid. It will be observed that separation of the variously soluble isomeric forms, as well as resolution of the optical isomers themselves, may be effected upon either the methoxy intermediates or upon the hydroxy end-products with equal practicability. If one of the separated and purified optical isomers or isomeric forms of the methoxy intermediate is subjected to demethylation, the corresponding isomeric form of the hydroxy end product is obtained.

This invention embraces all of the isomeric forms arising from optically active centers of these compounds. It is intended that the designation of the compounds of this invention, by names and formulae throughout the specification and claims, shall be read to include all isomeric forms and mixtures thereof unless otherwise specified.

As more specifically illustrative of the compounds of this invention, as well as the method for their preparation, will be the following specific examples:

EXAMPLE 1

1,1 - bis - (6,7 - dihydroxy - 1,2,3,4 - tetrahydro-1-isoquinolyl) -methane dihydrobromide

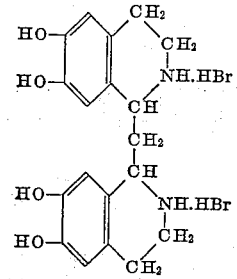

A solution of 20 g. of 1,1-bis-(6,7-dimethoxy-3,4 - dihydro - 1 - isoquinolyl) - methane dihydrochloride in 200 cc. of ethanol was reduced at room temperature with 50 lbs. of hydrogen and 1 g. of platinum oxide catalyst. After removal of the catalyst by filtration much of the ethanol was evaporated and on cooling a mixture of the two isomeric forms of the dimethoxytetrahydro compound crystallized from the solution.

A mixture of 18 g. of the isomeric mixture of 1,1 - bis - (6,7 - dimethoxy - 1,2,3,4 - tetrahydro-1-isoquinolyl) -methane dihydrochloride and 40 g. of 48% hydrobromic acid was heated with 1 g. of 50% hypophosphorous acid until the evolution of methyl bromide and hydrogen chloride ceased. Removal in vacuo of the excess hydrobromic acid yielded an oily residue which upon recrystallization from alcohol and ether provided a crystalline mixture of the two isomeric forms of 1,1-bis-(6,7 - dihydroxy - 1,2,3,4 - tetrahydro - 1 - isoquinolyl) -methane dihydrobromide, M. P. 264°.

EXAMPLE 2

1,4 - bis - (6,7 - dihydroxy - 1,2,3,4 - tetrahydro-1-isoquinolyl) -butane dihydrobromide

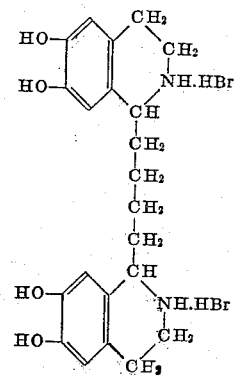

A mixture of 15 g. of 1,4-bis-(6,7-dimethoxy-3,4-dihydro-1-isoquinolyl)-butane dihydrochloride in 150 ml. of water was reduced with 1 g. of platinum oxide catalyst at 50 lbs. of hydrogen at 50° C. The catalyst was removed by filtration and the filtrate evaporated to dryness. The residual mixture of isomers of 1,4-bis-(6,7-dimethoxy - 1,2,3,4 - tetrahydro - 1 - isoquinolyl)-butane dihydrochloride was recrystallized from alcohol to provide a relatively alcohol-insoluble fraction, isomer A (M. P. 262–264°); isomer B (M. P. 258–260°) was obtained on evaporation of the filtrate. Each isomeric form was further purified by three recrystallizations from water and alcohol.

The fraction comprising isomer A, 5 g., was demethylated by heating with 25.0 g. of 48% hydrobromic acid and 0.5 g. of 50% hypophosphorous acid until no more hydrogen chloride or methyl bromide was evolved. Filtration of the crystals which formed upon cooling of the reaction mixture provided relatively pure isomer A of the product 1,4-bis-(6,7-dihydroxy-1,2,3,4-tetrahydro - 1 - isoquinolyl) - butane dihydrobromide. Recrystallization from alcohol provided pure isomer A melting at 267° C.

The fraction comprising isomer B of the bis-dimethoxy-tetrahydro intermediate was worked up in exactly the same fashion and provided pure isomer B of the final product which melted at 254° C.

EXAMPLE 3

*1,5 - bis - (6,7 - dihydroxy - 1,2,3,4 - tetrahydro - 1 - isoquinolyl) - pentane dihydrobromide*

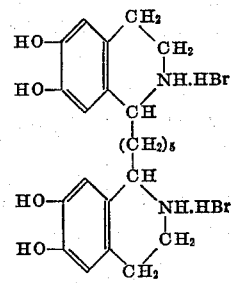

1,5 - bis - (6,7 - dimethoxy - 3,4 - dihydro - 1 - isoquinolyl)-pentane dihydrochloride was reduced to the bis-tetrahydro compound following a procedure identical with that of Example 2. The two isomeric forms of the bis-dimethoxy intermediate were separated in a manner described for Example 2, and purified by repeated recrystallizations. Isomer A was obtained by crystallization from alcohol-water and melted at 235–239°, and isomer B was obtained by crystallization from alcohol-acetone and melted at 224–227°.

Each of the purified isomeric fractions of the tetrahydro intermediate was then subjected to demethylation as described in Example 2 to form, respectively, purified isomeric forms of the bis-dihydroxy end product, isomer A after crystallization from alcohol-water melted at 185–187°, isomer B melted at 187–189° (with foaming) after recrystallization from alcohol-water.

EXAMPLE 4

*1,6 - bis - (6,7 - dihydroxy - 1,2,3,4 - tetrahydro - 1-isoquinolyl) -hexane dihydrobromide*

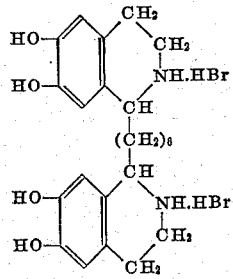

As in Example 2, 1,6-bis-(6,7-dimethoxy-3,4-dihydro-1-isoquinolyl) - hexane dihydrochloride was converted to the bis-dimethoxytetrahydro intermediate which was obtained in its two isomeric forms; each of which was purified by repeated recrystallization. The hydrochloride of isomer A melted at 271–3° and was obtained by crystallization from water; the hydrochloride of isomer B melted at 240–250° and was obtained by crystallization from ethanol-acetone.

Each of the isomeric forms of the bis-dimethoxy intermediates was demethylated in turn according to the procedure described in Example 2 to provide the isomer A fraction of the end product melting at 275–276° C., and the isomer B fraction which melted at 262–265° C., after recrystallization from water.

EXAMPLE 5

*1,7 - bis - (6,7 - dihydroxy - 1,2,3,4 - tetrahydro - 1-isoquinolyl) -heptane dihydrobromide*

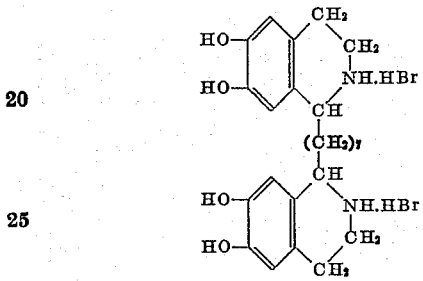

1,7 - bis - (6,7 - dimethoxy - 3,4 - dihydro - 1 - isoquinolyl)-heptane dihydrochloride was converted to the bis-tetrahydro compound and obtained in its two isomeric forms by the method of Example 2. The hydrochloride of isomer A after crystallization from alcohol-acetone melted at 231–234°; the hydrochloride of isomer B melted at 156–158° after crystallization from the same mixture. These were then demethylated according to the procedure of Example 2 to provide isomer A which melted at 184–185° (with frothing) after crystallization from water; and isomer B melting at 170–174° (with frothing) upon recrystallization from water.

EXAMPLE 6

*1,8 - bis - (6,7 - dihydroxy - 1,2,3,4 - tetrahydro - 1-isoquinolyl-octane dihydrobromide*

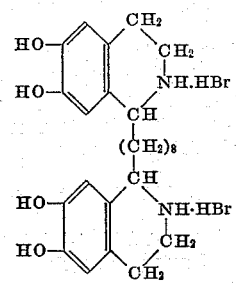

1,8 - bis - (6,7-dimethoxy - 1,2,3,4 - tetrahydro-1-isoquinolyl)-octane dihydrochloride was obtained in two isomeric forms by the reduction of 1,8 - bis - (6,7 - dimethoxy - 3,4 - dihydro - 1 - isoquinolyl) - octane dihydrochloride as described in Example 2. Isomer A melted at 215–218° after crystallization from water and isomer B (also crystallized from water) melted at 248–250°.

Demethylation of the purified isomers of the bis-dimethoxy compounds, as in Example 2, yielded the corresponding isomers of the bis-dihydroxy compounds. Isomer A was crystallized from water and melted at 259–263°. Isomer B, after crystallization from water, melted at 254–255°.

EXAMPLE 7

*1,9 - bis - (6,7 - dihydroxy - 1,2,3,4 - tetrahydro - 1-isoquinolyl)-nonane dihydrobromide*

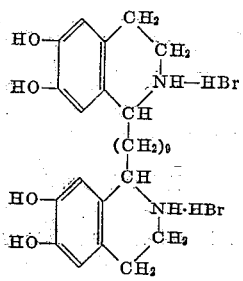

1,9 - bis - (6,7 - dimethoxy - 1,2,3,4 - tetrahydro - 1 - isoquinolyl) - nonane dihydrochloride obtained in two isomeric forms by the reduction of 1,9-bis-(6,7-dimethoxy-3,4-dihydro-1-isoquinolyl)-nonane dihydrochloride and the isomers were separated as described in Example 2. Demethylation of the purified isomers of the bis-dimethoxy compounds, as in Example 2, yielded the corresponding isomers of the bis-dihydroxy compounds.

EXAMPLE 8

*1,10 - bis - (6,7 - dihydroxy - 1,2,3,4 - tetrahydro-1-isoquinolyl)-decane dihydrobromide*

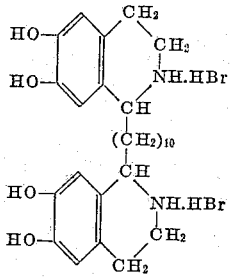

The two isomeric forms of 1,10-bis-(6,7-dimethoxy - 1,2,3,4 - tetrahydro - 1 - isoquinolyl) - decane dihydrochloride were obtained by catalytic hydrogenation of 1,10-bis-(6,7-dimethoxy-3,4-dihydro-1-isoquinolyl)-decane dihydrochloride as described in Example 2. Demethylation of each of the purified isomers of the bis-dimethoxy compounds gave the corresponding A and B isomers of the bis-dihydroxy compounds.

EXAMPLE 9

*1,6-bis - (6-hydroxy-1,2,3,4 - tetrahydro-1-isoquinolyl)-hexane dihydrobromide*

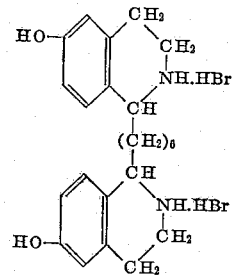

A solution of 15 g. of 1,6-bis-(6-methoxy-3,4-dihydro-1-isoquinolyl)-hexane dihydrochloride in 150 cc. of water was catalytically hydrogenated at room temperature and 50 pounds of hydrogen using 0.2 g. of platinum oxide catalyst. The product was dissolved by heating and the catalyst was removed by filtration. The 1,6-bis-(6 - methoxy-1,2,3,4-tetrahydro-1-isoquinolyl)-hexane dihydrochloride which was obtained on cooling melted at 277–279°. In this case the two isomers were not separated. Demethylation of this bis-dimethoxy compound as described in Example 2 yielded the bis-dihydroxy product, which melted at 271–273° after crystallization from methanol-ether.

EXAMPLE 10

*1,6-bis-(6,7,8-trihydroxy-1,2,3,4-tetrahydro-1-isoquinolyl)-hexane dihydrobromide*

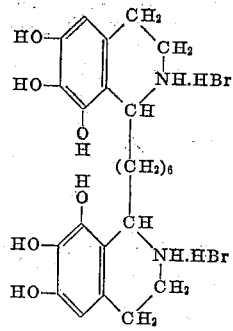

The two isomeric forms of 1,6-bis-(6,7,8-trimethoxy - 1,2,3,4-tetrahydro - 1 - isoquinolyl)-hexane dihydrochloride were obtained by catalytic hydrogenation of 1,6-bis-(6,7,8-trimethoxy-3,4-dihydro-1-isoquinolyl)-hexane dihydrochloride as described in Example 1. The corresponding A and B isomers of the bis-trihydro-tetra hydro compounds were obtained by demethylation of the appropriate isomers of the bis-trimethoxy compounds as described in Example 2.

EXAMPLE 11

*1,6-bis-(6,7-dihydroxy-3-methyl-1,2,3,4 - tetrahydro-1 - isoquinolyl) - hexane dihydrobromide*

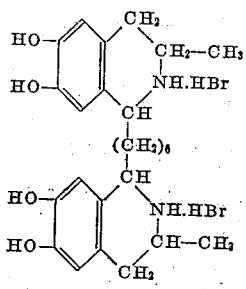

Catalytic hydrogenation of 21 g. of 1,6-bis-(6,7 - dimethoxy - 3-methyl-3,4-dihydro-1-isoquinolyl)-hexane in a mixture of 120 cc. glacial acetic acid and 20 cc. of water was carried out at 50 pounds and room temperature using 0.20 g. of platinum oxide catalyst. After removing the catalyst the filtrate was treated with an excess of hydrogen chloride in an ether solution. The isomeric mixture of 1,6-bis-(6,7-dimethoxy-3-methyl-1,2,3,4-tetrahydro-1-isoquinolyl) - hexane dihydrochloride which separated was crystallized from water. It did not melt below 300°. Demethylation of the isomeric mixture above as described in Example 2 yielded an isomeric mixture of the dihydrobromide of the bis-dihydroxy compound which melted at 277–285° (softening 230°) after crystallization from alcohol-water.

EXAMPLE 12

*1,6-bis-(6,7 - dihydroxy - 3 - isopropyl-1,2,3,4-tetrahydro-1-isoquinolyl) -hexane dihydrobromide*

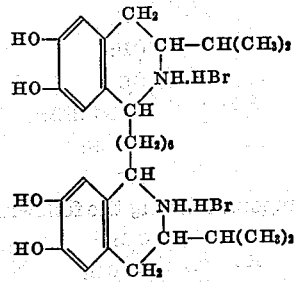

The isomeric mixture obtained by the hydrogenation of 1,6-bis-(6,7-dimethoxy-3-isopropyl-3,4-dihydro-1-isoquinolyl)-hexane as described in Example 11 was converted to the dihydrochloride and utilized as such. Demethylation (as in Example 2) of the isomeric mixture of 1,6 - bis - (6,7-dimethoxy-3 - isopropyl-1,2,3,4-tetrahydro-1-isoquinolyl)-hexane hydrochloride gave the corresponding dihydrobromide of the bis-dihydroxy compound which was purified by crystallization from alcohol-water.

EXAMPLE 13

*1,6-bis-(6,7-dihydroxy - 4 - methyl-1,2,3,4-tetrahydro - 1-isoquinolyl)-hexane dihydrobromide*

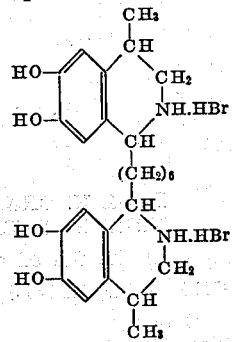

1,6 - bis - (6,7 - dimethoxy - 4 - methyl - 3,4-dihydro-1-isoquinolyl) - hexane dihydrochloride was reduced in aqueous solution at room temperature using 50 pounds of hydrogen and a platinum oxide catalyst as described in Example 2. The isomeric mixture of 1,6-bis-(6,7-dimethoxy-4 - methyl - 1,2,3,4 - tetrahydro - 1 - isoquinolyl) - hexane dihydrochloride thus obtained was used as such. Demethylation of the isomeric mixture as described in Example 2 gave in turn an isomeric mixture of the dihydrobromide of the bis-hydroxy compound. It was purified by crystallization from alcohol-water.

EXAMPLE 14

*1,6-bis-(6,7-dihydroxy-1,2,3,4-tetrahydro-1-isoquinolyl)-hexane dihydrochloride*

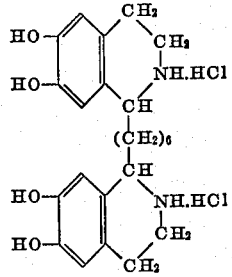

A mixture of 10 g. of the high-melting isomer A, M. P. 271-3° C. of 1,6-bis-(6,7-dimethoxy-1,2,3,4 - tetrahydroisoquinolyl) -hexane dihydrochloride prepared as an intermediate in Example 4 above, and 30 g. of concentrated hydrochloric acid were heated at 160° C. for three hours in a sealed Carius tube. Upon evaporation of the reaction mixture to dryness under vacuum, the corresponding isomer of 1,6-bis-(6,7-dihydroxy-1,2,3,4 - tetrahydroisoquinolyl)-hexane dihydrochloride was obtained. The product was purified by recrystallization from alcohol.

EXAMPLE 15

*1,6-bis-(6,7-dihydroxy-1,2,3,4-tetrahydro-1-isoquinolyl)-hexane*

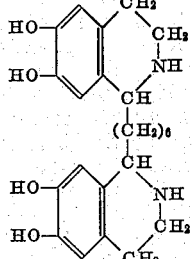

To a mixture of 54.8 g. of the dihydrochloride salt prepared in Example 13 above, in an aqueous solution was added 8.4 g. of sodium bicarbonate, and after stirring, the free base precipitated and was removed by filtration. The light yellow solid so obtained (decomposition range of 100-200° C.) is stable in the dry state. It is soluble in sodium hydroxide, and the resulting solution darkens when allowed to stand in contact with the air. The free base is unstable in benzene, ether and chloroform and is soluble in ethanol and methanol.

EXAMPLE 16

*1,6-bis-(6,7-dihydroxy-1,2,3,4-tetrahydro-1-isoquinolyl)-hexane diacetate*

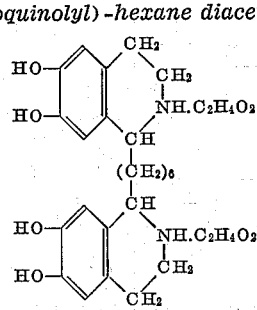

As illustrative of the preparation of organic salts of the compounds of this invention, 1.5 g. of the free base prepared in Example 15 above was dissolved in 3 milliliters of glacial acetic acid, and after 50 milliliters of ethanol was added to the resultant solution, ether was introduced dropwise until a cloudy precipitate was formed. Upon cooling the mixture the white crystalline acetate was separated by filtration and found to be soluble in water and to reduce solutions of silver nitrate.

The tartrate salt of the above amine base is prepared by a similar procedure, by mixing stoichiometric amounts of the free amine base and tartaric acid in desired form in ethanol. Upon addition of ether the tartrate salt precipitates and is collected by standard techniques.

In the foregoing examples hydrochlorides, hydrobromides and acetates according to this invention are exemplified. However, it will be understood and readily appreciated by those skilled in the art that the foregoing examples will illustrate the structure of organic or inorganic salts generally and will serve as specific examples of those organic and inorganic salts heretofore mentioned specifically by the writing in the several foregoing illustrative structures of the chemical symbols for the several acid groups heretofore specifically mentioned or of the acid group of any other desired organic or inorganic acid for the HCl or HBr in the several foregoing examples, respectively.

The foregoing examples illustrate the salts contemplated by this invention. The bases contemplated by this invention according to the broad and more particular structural formulae herein disclosed are specifically exemplified as will be obvious to anyone skilled in the art by reference to the foregoing specific examples with the removal from the structures illustrated thereby of the acid group, i. e., HCl or HBr.

As will be apparent, the organic and inorganic salts contemplated by this invention will be prepared from the bases in a manner usual and well known to those skilled in the art, as by neutralizing the bases with organic or inorganic acids.

The bases contemplated by this invention will be formed by carefully interacting the salts contemplated by this invention and herein exhaustively exemplified with one molecular equivalent of a basic reagent such, for example, as ammonium hydroxide, sodium hydroxide, potassium hydroxide, lithium hydroxide, or the like, in aqueous solution at room temperature or below, and the bases so liberated are separated by filtration or centrifugation. The preparation of free bases from salts is illustrated under Example 15.

What is claimed is:

1. A compound of the class consisting of a free base and its acid addition salts, the free base having the formula:

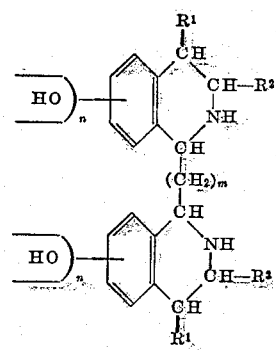

in which $R^1$ and $R^2$ are selected from the group consisting of hydrogen and lower alkyl radicals; $n$ is an integer of from 1 to 3; and $m$ is an integer of from 1 to 12.

2. The compound having the following formula:

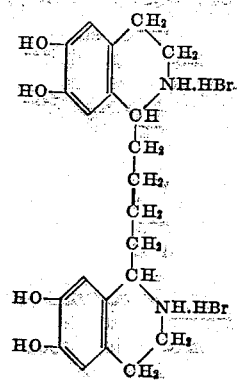

3. The compound having the following formula:

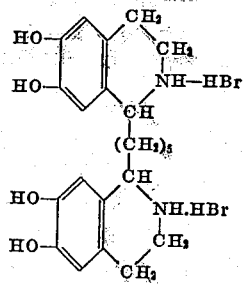

4. The compound having the following formula:

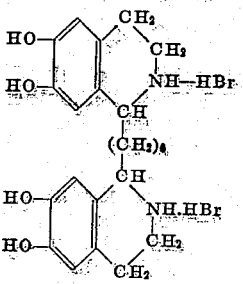

5. The compound having the following formula:

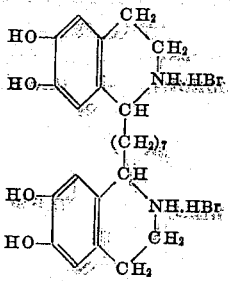

PAUL N. CRAIG.
FRED P. NABENHAUER.

References Cited in the file of this patent

FOREIGN PATENTS

| Number | Country | Date |
|---|---|---|
| 512,560 | Great Britain | Sept. 20, 1939 |
| 513,512 | Great Britain | Oct. 13, 1939 |

OTHER REFERENCES

Buck et al., J. Am. Chem. Soc., vol. 60, pp. 2101–2103 (1938).

Pailer et al., Monatshefte für Chemie, vol. 79, pp. 135–141 (1948).

Craig, Chem. Reviews, vol. 42, pp. 341–369 (1948).